United States Patent [19]
Hoppes

[11] Patent Number: 5,042,053
[45] Date of Patent: Aug. 20, 1991

[54] ZERO-SYNC-TIME APPARATUS FOR ENCODING AND DECODING

[75] Inventor: Ronald R. Hoppes, Royersford, Pa.

[73] Assignee: Honeywell Inc., Minneapolis, Minn.

[21] Appl. No.: 568,007

[22] Filed: Aug. 16, 1990

[51] Int. Cl.[5] .................................... H04L 7/00
[52] U.S. Cl. ........................... 375/106; 375/36; 340/825.06
[58] Field of Search ............... 375/106, 107, 118, 121, 375/36; 370/85.1, 85.9, 91; 340/825.2, 825.21, 825.06; 455/608

[56] References Cited

U.S. PATENT DOCUMENTS

| | | | |
|---|---|---|---|
| 4,393,516 | 7/1983 | Itani | 375/106 |
| 4,756,010 | 7/1988 | Nelson et al. | 340/825.21 |
| 4,807,259 | 2/1989 | Yamanaka et al. | 340/825.06 |
| 4,841,549 | 6/1989 | Knapp | 375/106 |
| 4,847,867 | 7/1989 | Nasu et al. | 375/106 |
| 4,868,809 | 9/1989 | Kahn | 455/608 |
| 4,873,703 | 10/1989 | Crandall et al. | 375/106 |
| 4,961,205 | 10/1990 | Kuwaoka | 375/36 |
| 4,964,141 | 10/1990 | Matsushima | 375/36 |

Primary Examiner—Stephen Chin
Attorney, Agent, or Firm—A. A. Sapelli; D. J. Lenkszus; A. Medved

[57] ABSTRACT

In a digital data transmission system for transmitting a serial digital data stream between a first unit and a second unit connected to a first and second bus, respectively, a first apparatus interfaces the first bus to a transmission medium and a second apparatus interface the second bus to the transmission medium. The first and second unit and the first and second apparatus each have their own clock circuit. The first and second apparatus each comprise an encoder which outputs the serial digital data stream onto the transmission medium corresponding to serial data received from the first bus during a transmission period of the first bus. The encoder outputs the serial digital data stream onto the transmission medium in a predetermined format during a quiescent period of the first bus. A phase relationship of the serial data and the serial digital data stream outputted at the start of transmission between the quiescent period and the transmission period is established in a single bit time. A decoder decodes the serial digital data stream inputted from the transmission medium to determine the bit value of information. A receiver/transmitter couples the signals between the first bus and the apparatus.

8 Claims, 10 Drawing Sheets

ZERO-SYNC-TIME APPARATUS FOR ENCODING AND DECODING

BACKGROUND OF THE INVENTION

This invention relates to digital data transmission systems, and more particularly, to a circuit for immediately establishing a phase relationship of a serial digital data stream wherein a receiving and transmitting circuit each have independent clocking circuits.

In transmitting serial digital data, it is necessary to provide a series of clock pulses in addition to the data pulses in order to synchronize the coding of the transmitted serial digital data at a receiving terminal or the receiver. In prior-known transmitting schemes, two transmission lines or paths, or two channels were required for this purpose, one for the data signal and one for the clocking signal. In attempting to avoid the requirement for a dual transmission path (or two channels), self-clocking codes evolved as a result of combining the clock and data signals. The Manchester code is one such self-clocking code. Manchester encoders accept clock and data and combine them into a single output which may be transmitted by a single transmission line to the receiving terminal. When the self-clocking data (i.e., the serial digital data stream) arrives at the receiving terminal, it is processed by a decoder which extracts separately both data and clock from the input self-clocking coded signal. Generally, these prior-known transmitting schemes require several bit-times for establishing the phase relationship between the serial digital data stream and the timing of the receiver. Sometimes this is achieved by a preamble defined in a protocol.

Thus there is a need for providing an apparatus which can essentially instantaneously change phase relationship to correspond to the phase relationship of the incoming data.

SUMMARY OF THE INVENTION

Therefore, there is provided by the present invention, an apparatus for changing phase relationship to correspond to the phase relationship of the incoming data essentially simultaneously. In a digital data transmission system for transmitting a serial digital data stream between a first unit and a second unit connected to a first and second bus, respectively, a first apparatus interfaces the first bus to a transmission medium and a second apparatus interface the second bus to the transmission medium. The first and second unit and the first and second apparatus each have their own clock circuit. The first and second apparatus each comprise an encoder which outputs the serial digital data stream onto the transmission medium corresponding to serial data received from the first bus during a transmission period of the first bus. The encoder outputs the serial digital data stream onto the transmission medium in a predetermined format during a quiescent period of the first bus. A phase relationship of the serial data and the serial digital data stream outputted at the start of transmission between the quiescent period and the transmission period is established in a single bit time. A decoder decodes the serial digital data stream inputted from the transmission medium to determine the bit value of information. A receiver/transmitter couples the signals between the first bus and the apparatus.

Accordingly, it is an object of the present invention to provide an apparatus for instantaneously changing phase relationship.

It is another object of the present invention to provide an apparatus for instantaneously changing phase relationship to that of the incoming data.

These and other objects of the present invention will become more apparent when taken in conjunction with the following description and attached drawings, wherein like characters indicate like parts, and which drawings form a part of the present application.

DETAILED DESCRIPTION

Figure 1:
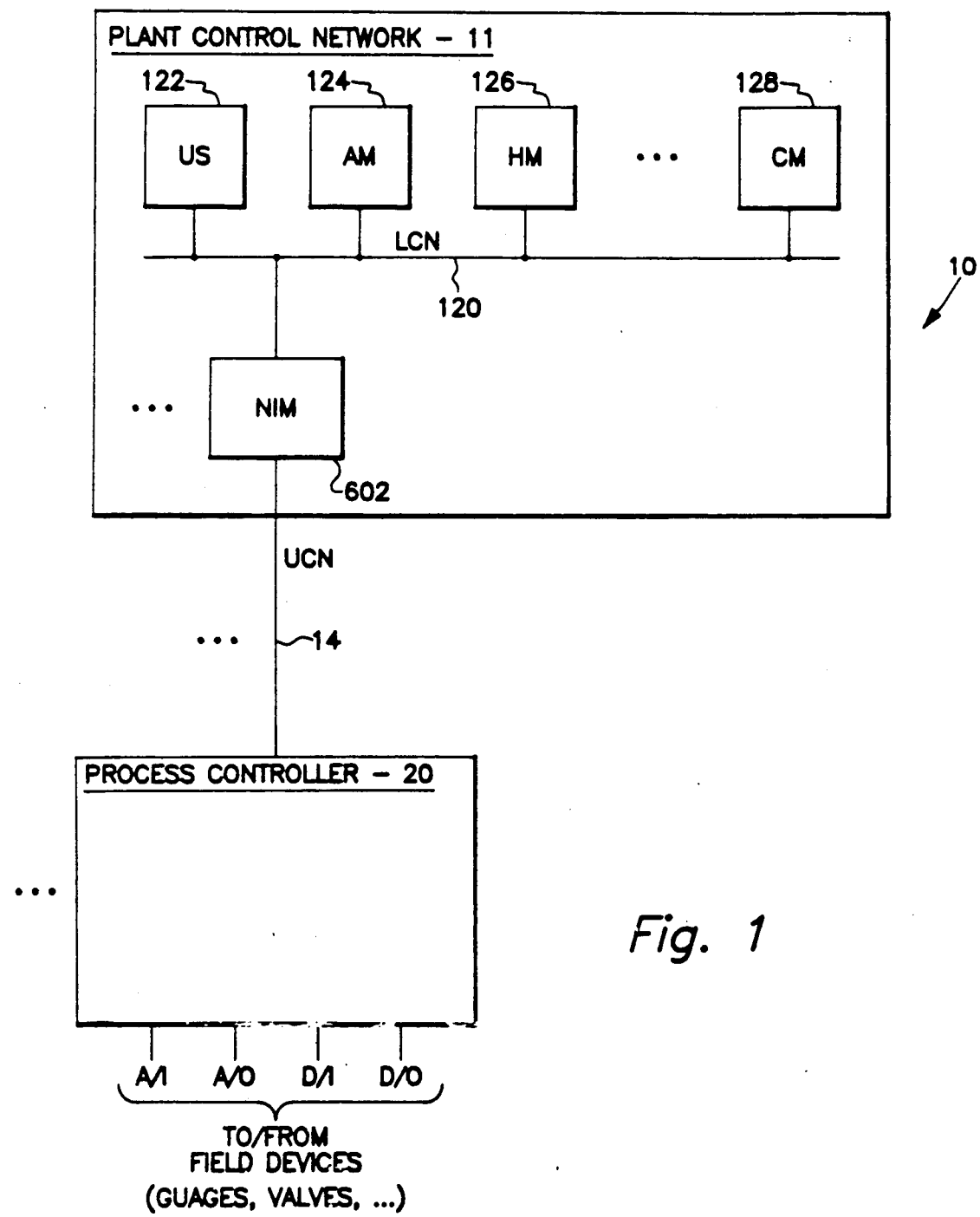
FIG. 1 shows a block diagram of a process control system in which the present invention can be utilized.

Before describing the apparatus and method of the present invention, it will be helpful in understanding a system environment in which the apparatus of the present invention can be utilized. Referring to FIG. 1, there is shown a block diagram of a process control system 10 in which the apparatus of the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM)

126, a computer module (CM) 128, and duplicates of these modules (and additional types of modules, not shown) as necessary to perform the required control/supervisory function of the process being controlled. Each of these physical modules is connected to a local control network (LCN) 120 which permits each of these modules to communicate with each other as necessary. The NIM 602 provides an interface between the LCN 120 and the UCN 14. A more complete description of the plant control network 11, and the physical modules can be had by reference to U.S. Pat. No. 4,607,256.

Figure 2:
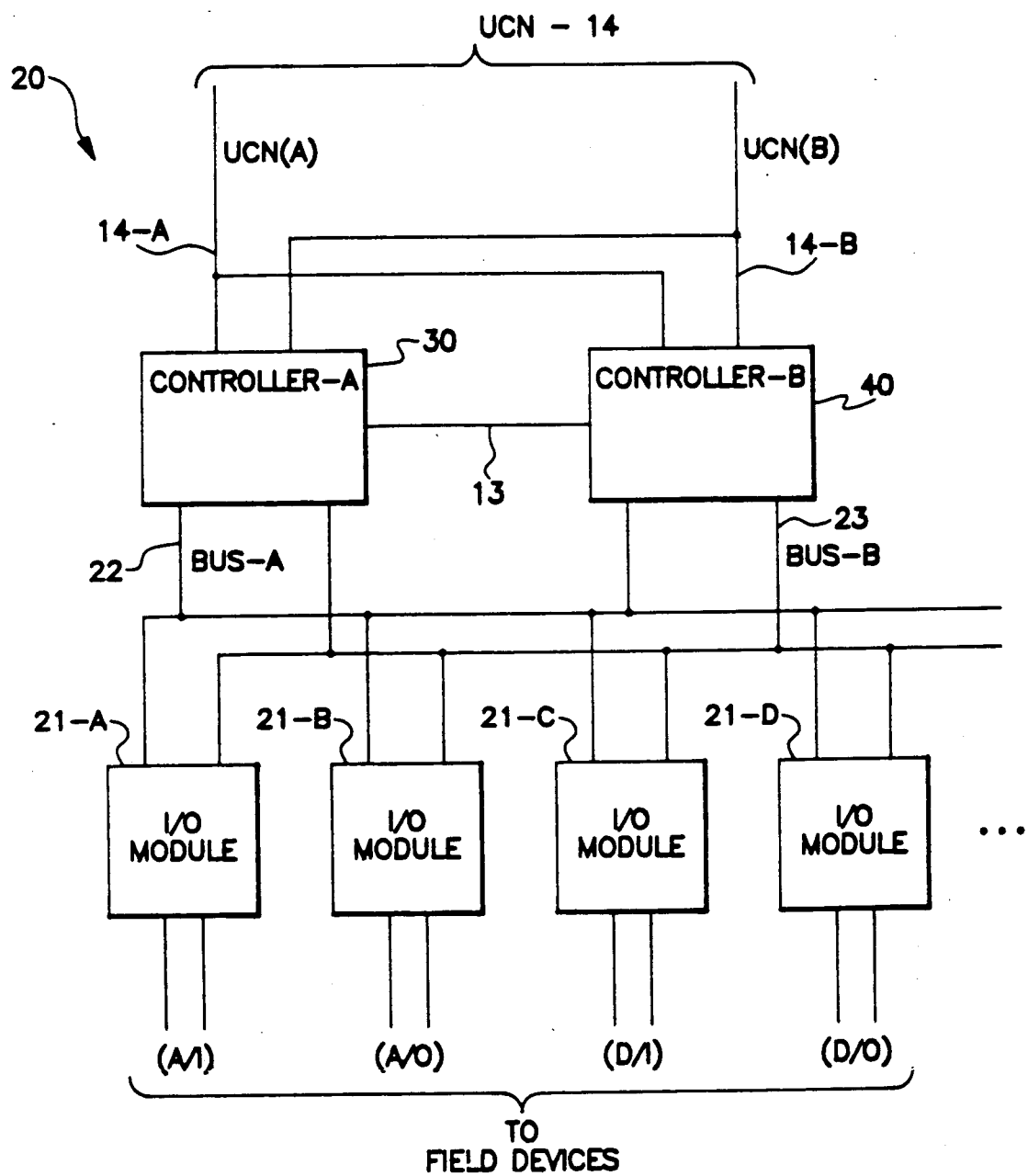
FIG. 2 shows a block diagram of a process controller, including I/O modules, in which the present invention can be utilized.

Referring to FIG. 2 there is shown a block diagram of the process controller 20, which includes the apparatus of the present invention. The process controller 20 of the preferred embodiment of the process control system 10 includes a controller A 30 and a controller B 40, which effectively operate as a primary and secondary controller. Controller A 30 and controller B 40 are connected to the UCN 14, the UCN 14 in the preferred embodiment, comprising for communication redundancy purposes, a UCN(A) 14A and a UCN(B) 14B. Input output (I/O) modules 21 interface to field devices, field devices being various valves, pressure switches, pressure gauges, thermocouples, . . . which can be analog inputs (A/I), analog outputs (A/O), digital inputs (D/I), and digital outputs (D/O). The controller A 30 interfaces to each I/O module 21 via a bus A 22, and controller B 40 interfaces to each I/O module 21 via a bus B 23. In addition, once again for communication redundancy purposes, controller A 30 is also connected to bus B 23 and controller B 40 is connected to bus A 22.

Controller A and controller B, 30, 43, can communicate with each other via three mediums, the UCN 14, a link 13 between the controllers, and the buses A, B, 22, 23, and bus A and bus B in the preferred embodiment being serial I/O links. One controller (controller A 30 or controller B 40) operates as a primary controller and the other controller operates as a secondary controller (in more of a reserve mode than a back-up, in that if a failure of controller A 30 should occur, controller B is ready to take over the control function with essentially no start-up or initialization time). On a predetermined time basis, point processing is performed by the controller designated as the primary controller and communicates with the I/O modules 21. In addition, the controller acting as the primary controller communicates with the plant control network 11 reporting status, history, and accepting inputs from the plant control network such as commands from the operator via the universal station 122. In addition, a data base maintained by the primary controller is communicated to the secondary controller via link 13. As mentioned above, one controller operates as a secondary controller; however, it will be understood by those skilled in the art that a secondary controller is not necessary for the process controller 20.

Figure 3:
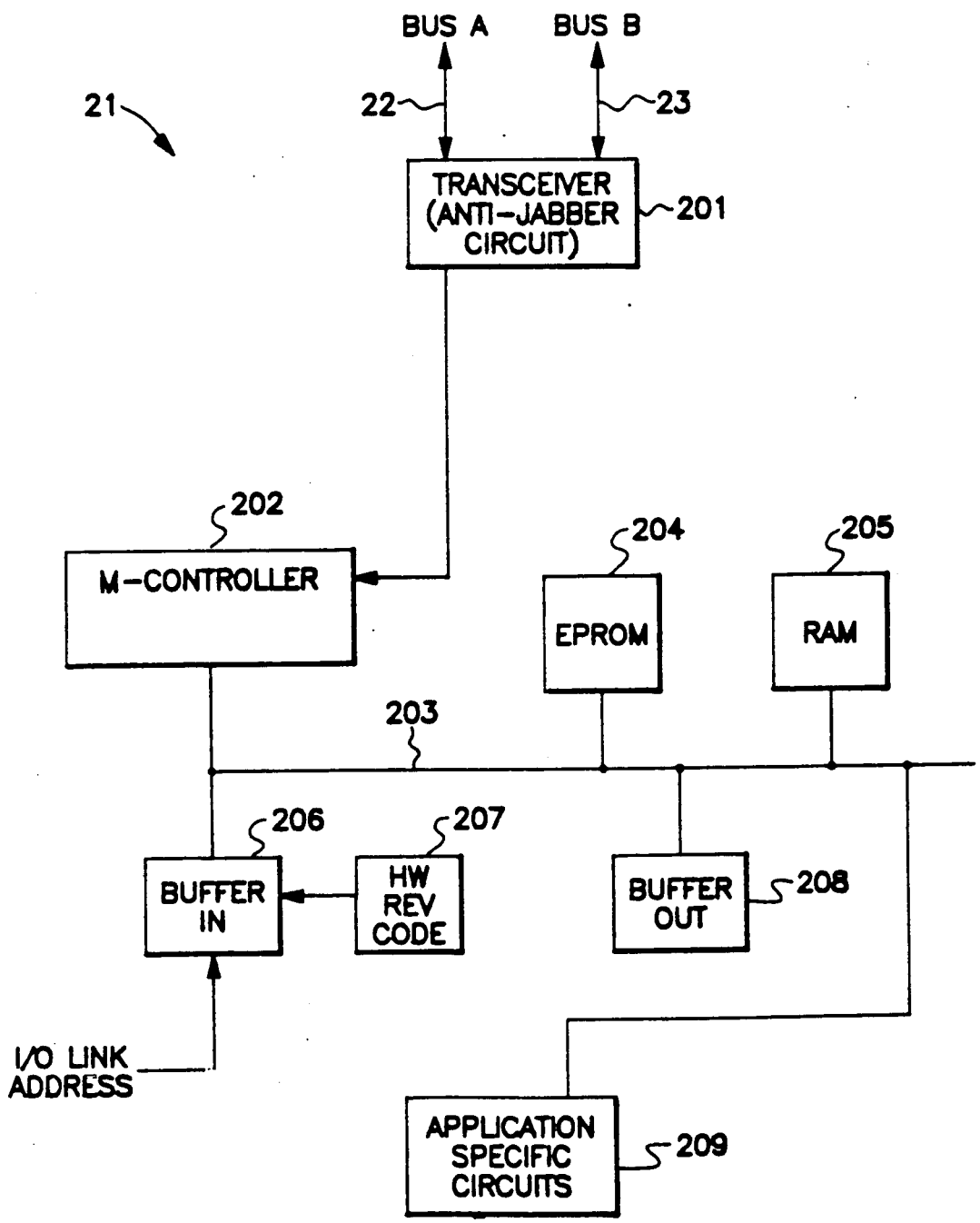
FIG. 3 shows a block diagram of an I/O module which interfaces with the apparatus of the present invention.

Referring to FIG. 3 there is shown a block diagram of an I/O module. A transceiver (anti-jabber circuit) 201 interfaces with bus A 22 and bus B 23. The transceiver 201 interfaces with a microcontroller (μ-controller) 202 which, in the preferred embodiment, is of the type, Intel 80C31. The microcontroller is coupled to a local bus 203, and includes an EPROM 204 and a RAM 205 also attached to the local bus 203. The RAM 205 contains the information which forms the database for the I/O module 21. The EPROM 204 contains the program information utilized by the microcontroller 202. Also attached to local bus 203 is an input buffer 206 which receives the I/O link address information from the I/O link (bus A, bus B, 22, 23). The output buffer (BUFFER OUT) 208 is connected to the local bus 203. The application specific circuits 209 is also connected to the local bus 203 and interfaces with the input and output buffers 206, 208, and the microcontroller 202 via the local bus 203. The application specific circuits 209 vary from I/O module to I/O module depending on the field device to which the I/O module is to be coupled. If the field device is of a type which requires a digital input, then the application specific circuit 209 will include the logic in order to place the digital input into a predefined format which will interface with the remainder of the I/O module. Likewise, if the field device is such that requires an analog input, then the application specific circuit contains logic which converts the analog input signal (via an A/D converter) into a format again consistent with predefined formats. In this manner, the I/O modules are referred to as a specific I/O module type. The microcontroller 202 performs the I/O processing (or preprocessing) for the application specific circuits 209. The preprocessing will vary from each I/O module 21 depending on the type (i.e., A/I, A/O, . . .) the preprocessing essentially consisting of translating the signals from the application specific circuits to a format compatible with the controller 30, 40, and putting the signals from controller 30, 40 in a format compatible with the I/O module 21. Some of the preprocessing performed includes zero drift, linearization (linearizing thermocouples), hardware correction, compensation (gain compensation and zero compensation), reference junction compensation, calibration correction, conversions, checking for alarms (limits) . . . and generating a signal in a predetermined format having predetermined scale (i.e., engineering units, normalized units, percent of scale, . . .). In the preferred embodiment seven types of applications specific circuits are provided for, these include a high level analog input, low level analog input, analog output, digital input, digital output, smart transmitter interface, and pulse input counter.

Figure 4:
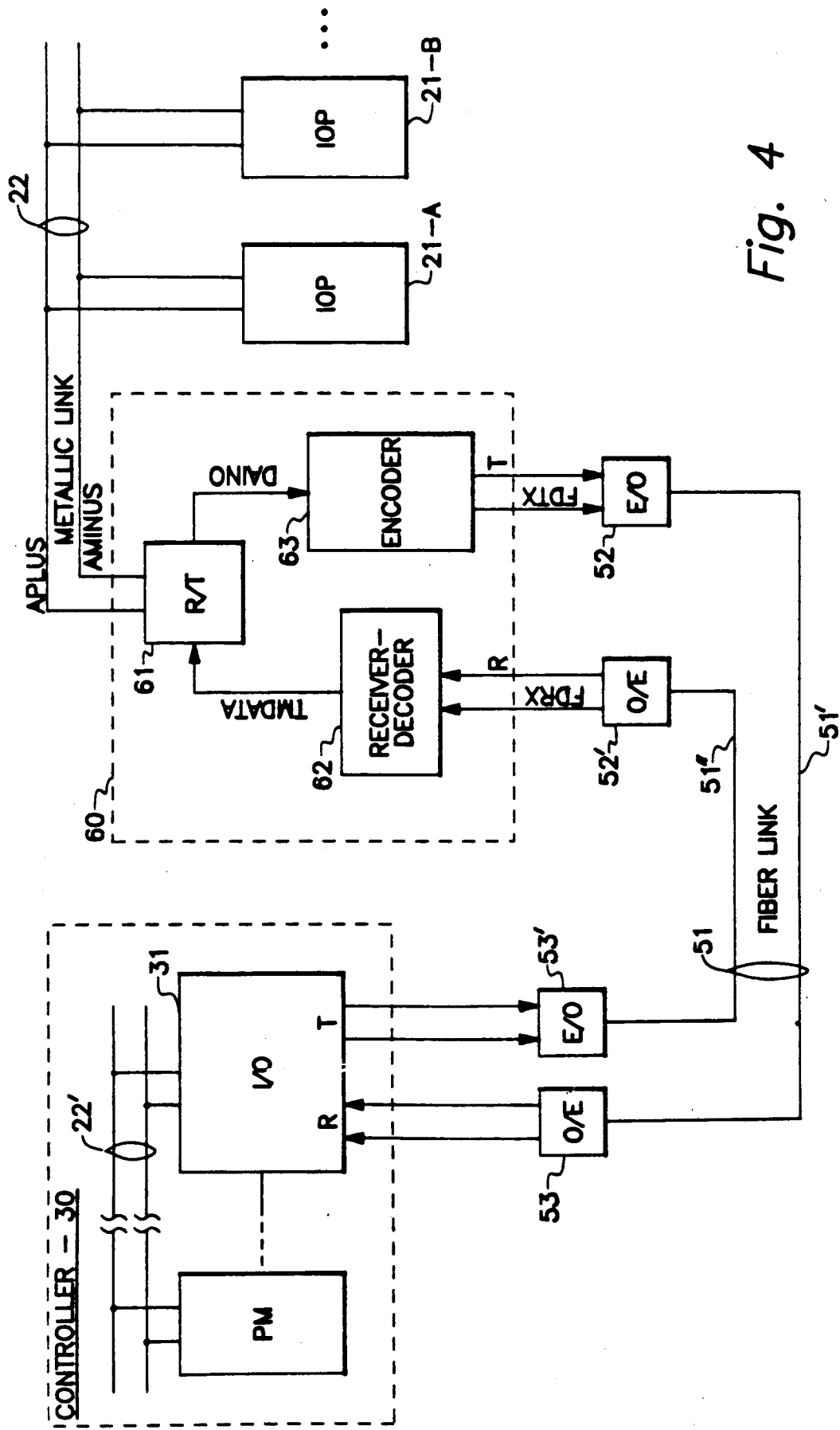
FIG. 4 shows a block diagram of the transmission system of the present invention.

In some configurations (see FIG. 2), and in particular when the distances between controller A 30 and the IOP modules 21, become relatively large, the bus A 22 can be susceptible to noise, . . . In order to reduce these disturbances, a fiber optic link car be utilized. Referring to FIG. 4, there is shown a block diagram of a serial digital data transmission system of the preferred embodiment of the present invention which includes an optical fiber link 51 (sometimes referred to herein as fiber optic link or fiber link) between the controller 30 and the IOPs 21. (The redundant controller 40 and the bus B 23 are omitted here for simplicity.) An apparatus 60 of the present invention provides an interface between the metallic link 22 (which is the backplane wiring for the IOPs which also form part of the bus A 22 in the preferred embodiment of the process control system 10) and the fiber link 51. The controller 30 includes an I/O, unit 31 which also includes the logic of apparatus 60. The transmit terminals (T) of apparatus 51 are connected to an electro-optical converter (E/O) 52 and the receive terminals R of I/O unit 31 are connected to an optical-electrical converter (O/E) 53, the O/E 53 being connected to the fiber link 51' from the E/O 52. The apparatus 60 of the present invention includes a receiver/transmitter (R/T) 61 for coupling signals between the metallic link 22 and the apparatus 60. Signals received from I/O unit 31 via O/E 52' are coupled from the R terminals of apparatus 60 to a decoder 62, and the output signal of the decoder is coupled to the metallic link 22 via R/T 61. Signals received by the apparatus 60 from any of the IOPs 21 via R/T 61, are coupled to an encoder 63 and the output of the encoder is subsequently coupled to the T terminals of apparatus 60 for transmission on the fiber link 51. The apparatus 60 of the preferred embodiment of the present invention will be discussed hereinunder.

Figure 5:
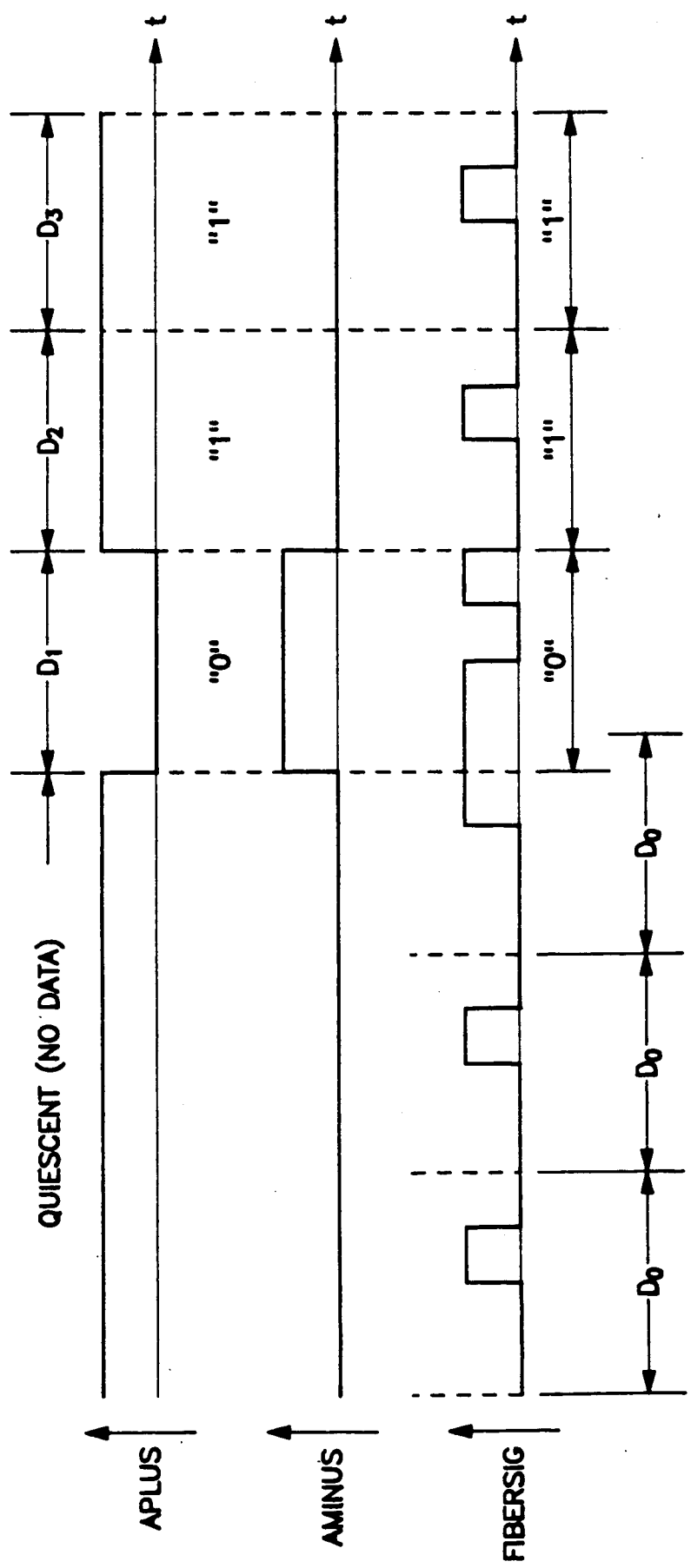
FIG. 5 shows a timing diagram of the signals used in the transmission system of FIG. 4.

In the operation of the system of FIG. 4, the IOPs 21 are online and awaiting (listening) for communication on the metallic link 22 from controller 30 (the controller 30 includes a plurality of modules which are connected via a metallic link 22', the I/O unit 31 also including logic corresponding to the apparatus 60). In the quiescent state, there is no signal on the metallic link 22 (i.e. the metallic link 22 is inactive). Thus a signal A PLUS, A MINUS, on the metallic link is shown in FIG. 5, i.e. in the preferred embodiment it is a balanced line. The fiber link 51 is always active even in the quiescent state and transmits a "1" data bit, FIBERSIG, as a string of D0 during the quiescent state. When the IOP 21 wishes to communicate with controller 30, it begins by transmitting a "0" followed by a valid character. Upon receiving valid characters from the metallic link, the apparatus 60 turns on a driver (not shown) to drive the fiber link 51' with the valid character. At the receiving end, the decoder (of the I/O 31 not shown) turns on an associated driver (not shown) to drive the metallic link 22'. This generally describes a transmission from IOP 21 to controller 30. It will be understood by those skilled in the art that a similar operation occurs for a communication from controller 30 to IOP 21 via fiber link 51". The transition of the "1" on the fiber link to a "0" (at the beginning of the transmission from the IOP of the character received from the metallic link) bears no phase relationship to what the fiber was transmitting in the quiescent state, since all the IOPs and the apparatus 60 each have their own clocking circuit. FIG. 5 shows a condition relating to the above discussion. The signal (FIBERSIG) on the fiber link 51 transmits "1's" during the quiescent state of the metallic link 22 (shown as bits D0). At any point in time a digital data stream can be initiated onto the metallic link 22, the first bit (D1) being a "0". The figure depicts the bit D1 being started before the end of the "1" data bit D0 on the fiber link. In this fashion the phase relationship can be immediately established.

Figure 6:
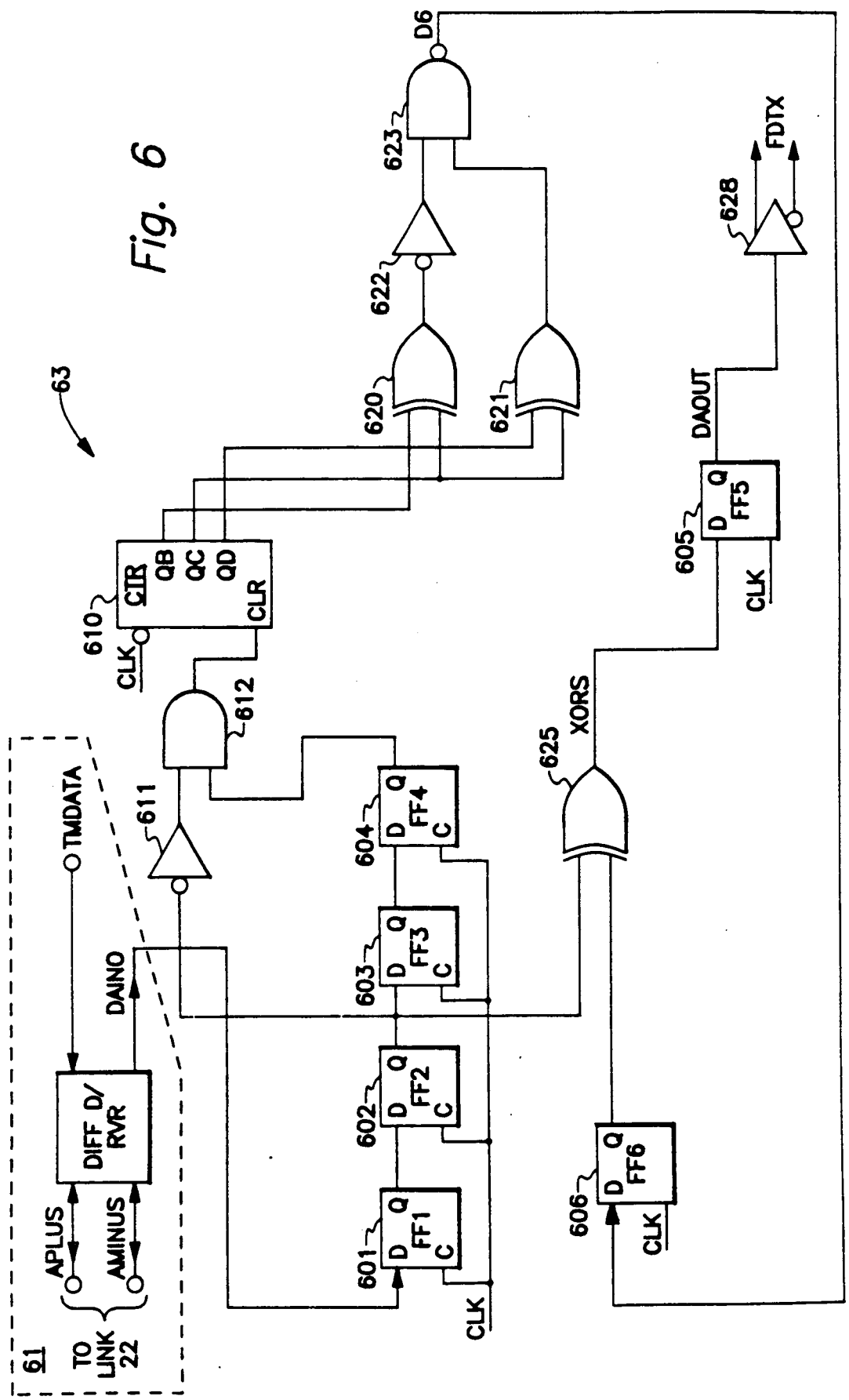
FIG. 6 shows a logic diagram of the encoder of the apparatus of the preferred embodiment of the present invention.

Referring to FIG. 6, there is shown a logic diagram of the encoder 63 of the apparatus 60 of the preferred embodiment of the present invention. The balanced lines of metallic link 22 couple the signals A PLUS, A MINUS to the differential driver/receiver 61. In the preferred embodiment of the present invention a circuit DS3695, well known to those skilled in the art, is utilized. The output of the driver/receiver 61 is a signal DAINO which is coupled to the encoder 63 and represents a bit value received from the metallic link 22, the bit value having 16 clock times, the first predetermined number of clock times of the preferred embodiment. The input signal TMDATA is a signal obtained from the controller 30 which is to be coupled to the metallic link 22 for the IOPs 21. Although only the apparatus 60 connected to the metallic link 22 of the IOPs will be discussed, it will be understood by those skilled in the art that the logic of the I/O unit 31 of the controller 30 operates in the same manner for transmissions to apparatus 60 and receipt of data from apparatus 60.

Figure 7:
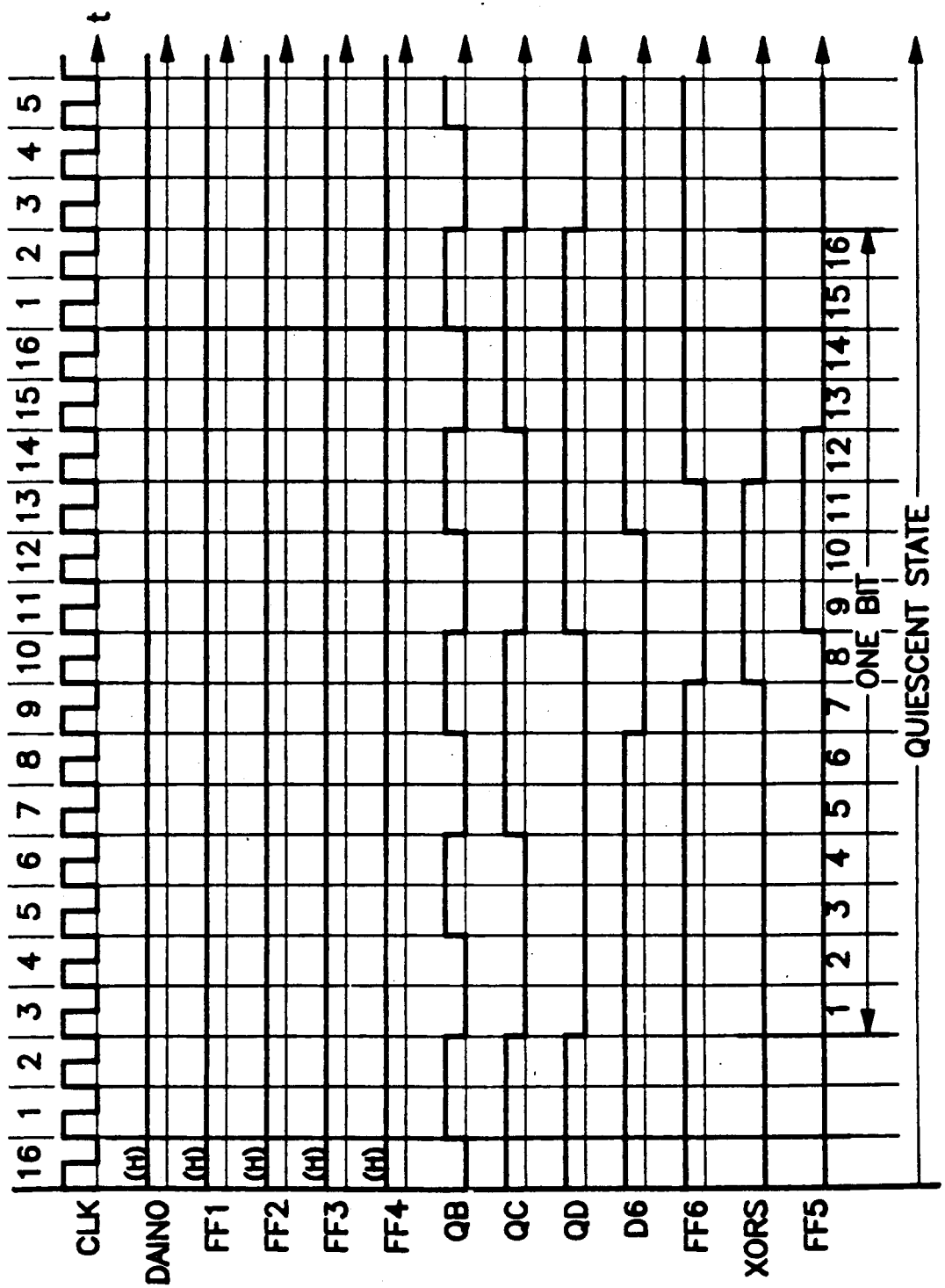
FIG. 7 shows a timing diagram of the generation of a logic one signal by the encoder for transmission on a fiber link.

Still referring to FIG. 6, the encoder 63 will now be discussed. The signal from driver/receiver 61, DAINO, is inputted to a first flip flop (FF1) 601. In the quiescent state, DAINO is high (for a logic one for a positive logic). After four clock times the first flip flop 601, and a second, third, and fourth flip flop (FF2, FF3, and FF4) 602, 603, 604, respectively, connected in a shift register arrangement will all be high. A counter 610 will continue to count clock pulses when the input to the clear terminal is low. The output of FF2 602 is inverted by an invertor 611 and coupled to an AND-gate 612. The output of FF4 604 is also connected to AND-gate 612. The output of the AND-gate 612, connected to the clear terminal of counter 610 will be low during the quiescent state since the signal outputted from flip flop 2 is inverted from high to low thereby disabling AND-gate 612. The counter 610, a four bit binary counter, has the second output QB connected to a first exclusive OR-gate 620, the third output QC coupled to the first exclusive OR-gate 620 and to a second exclusive OR-gate 621, and a fourth output QD connected to the second exclusive OR-gate 621. The output from the first exclusive OR-gate 620 is inverted by an invertor 622 and connected to a NAND-gate 623. The output of the second exclusive OR-gate 621 is connected to the NAND-gate 623. The output of the NAND-gate, D6, is then coupled to flip flop 6 ,FF6) 606, the output of flip flop 6 606 being coupled to an exclusive OR-gate 625 The output of flip flop 2 602 is also coupled to the exclusive OR-gate 625. The output of exclusive OR-gate 625, XORS is connected to a fifth flip flop (FF5) 605 and the output of FF5 605, denoted DAOUT is coupled to a driver 628. The driver in the preferred embodiment of the present invention is of the type DS8922D well known to those skilled in the art. The output of the driver 628 is the output of the encoder which is coupled to the electro/optical converter 52. The outputs of counter 610 are combined in the exclusive OR-gates and NAND-gate 620, 621, 622, 623 to generate the output signal D6 which is a four clock wide pulse (the second predetermined number of clock times of the preferred embodiment) essentially in the center of the time period comprising sixteen clock pulses, indicated in FIG 7. FIG. 7 shows a timing diagram of the apparatus 60 for generating the output quiescent data pulse defined as a "1". The output of flip flop 5, denoted DAOUT applied to the driver/receiver combination of E/O 52, so that the signal appearing on the fiber link 51 is as depicted in FIG. 5. It will be obvious to those skilled in the art that the signal on the fiber link 51 being transmitted is an optical signal and is depicted in FIG. 5 such that the "0" corresponds to the light being on and the "1" condition where the light is off.

Figure 8:
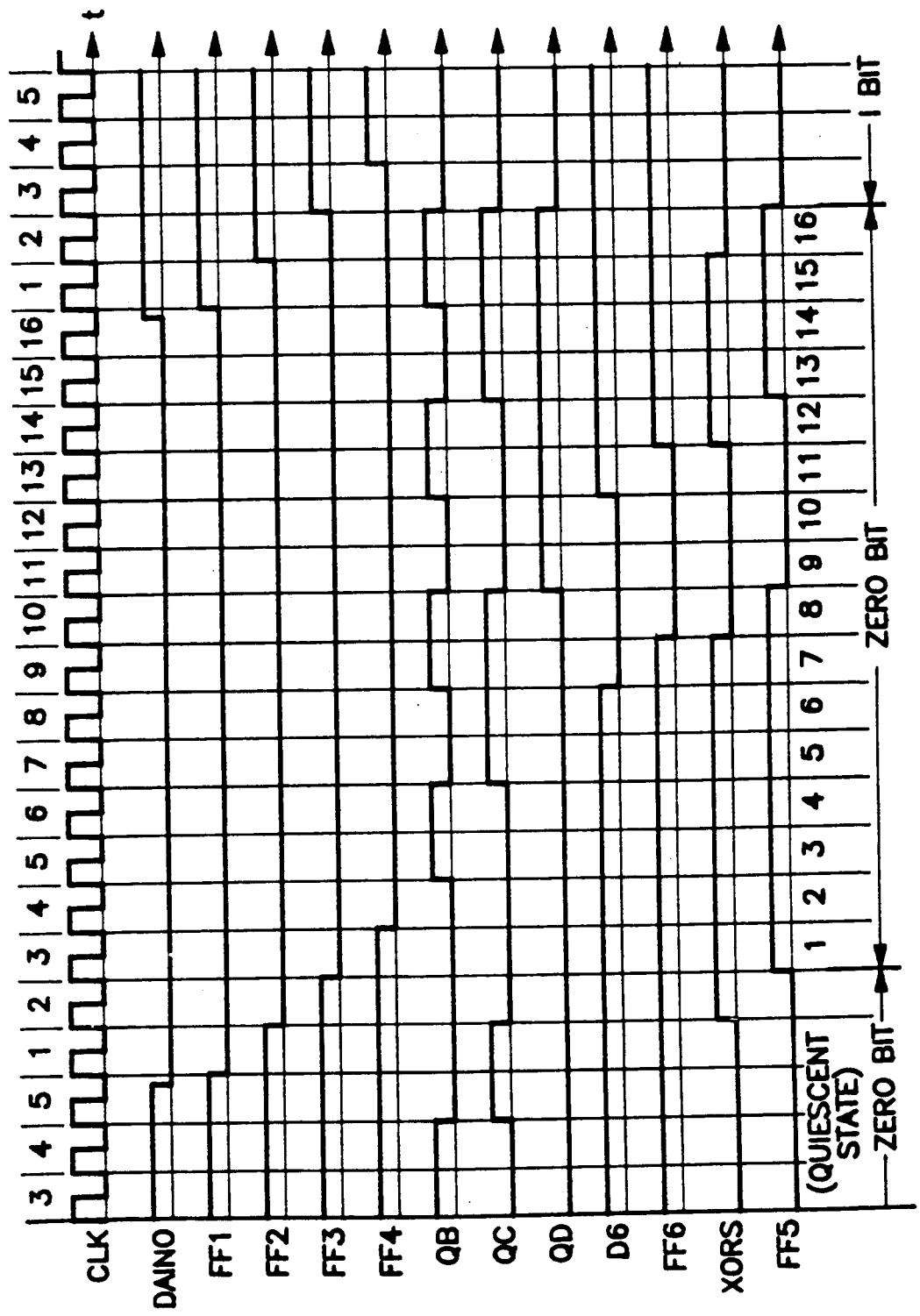
FIG. 8 shows a timing diagram of the transition from the quiescent state to the start of data flow.

Referring to FIG. 8, there is shown a timing diagram of the transition from the quiescent state to the start of data flow, i.e. being "1" to "0" transition which is the start bit. In FIG. 8 it is assumed for example purposes only that the input data DAINO switches from the high state to low state indicating the "0" bit for the start of data. This occurs at some random clock time selected here for example purposes to be during clock time five. As a result the first through fourth flip flop 601-604, all switch to a low state one clock time after the previous flip flop switches, as shown. As a result of the action of AND-gate 612, the counter stops counting when the second flip flop switches low and starts counting again when the second input from flip flop 4 switches to a low state. The outputs of the counter are combined and output the signal D6. The resultant output from combining all the signals is shown in FIG. 8 and the "0" bit is specifically identified two clock times after the data has switched. Note also that DAIN0 then switches to a "1", for example purposes only and starts the waveforms for the "1" state (after clock 16). This has already been described for the quiescent state and is a simple exercise to continue the waveforms and derive combinations in showing the output "1" bit from flip flop 5 to have the waveform as shown in FIG. 7.

Figure 9:
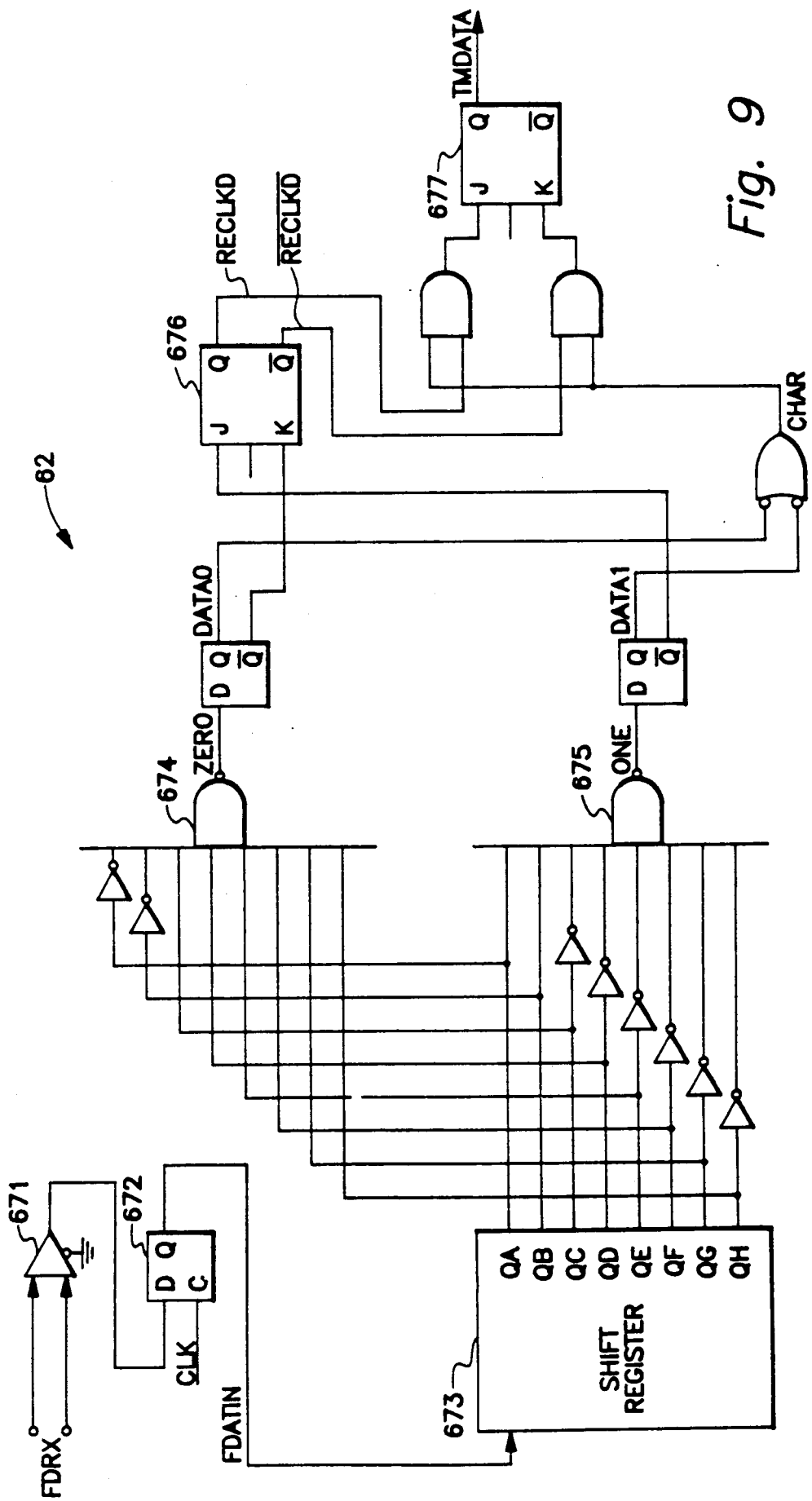
FIG. 9 shows a logic diagram of the decoder of the preferred embodiment of the present invention.
Figure 10:
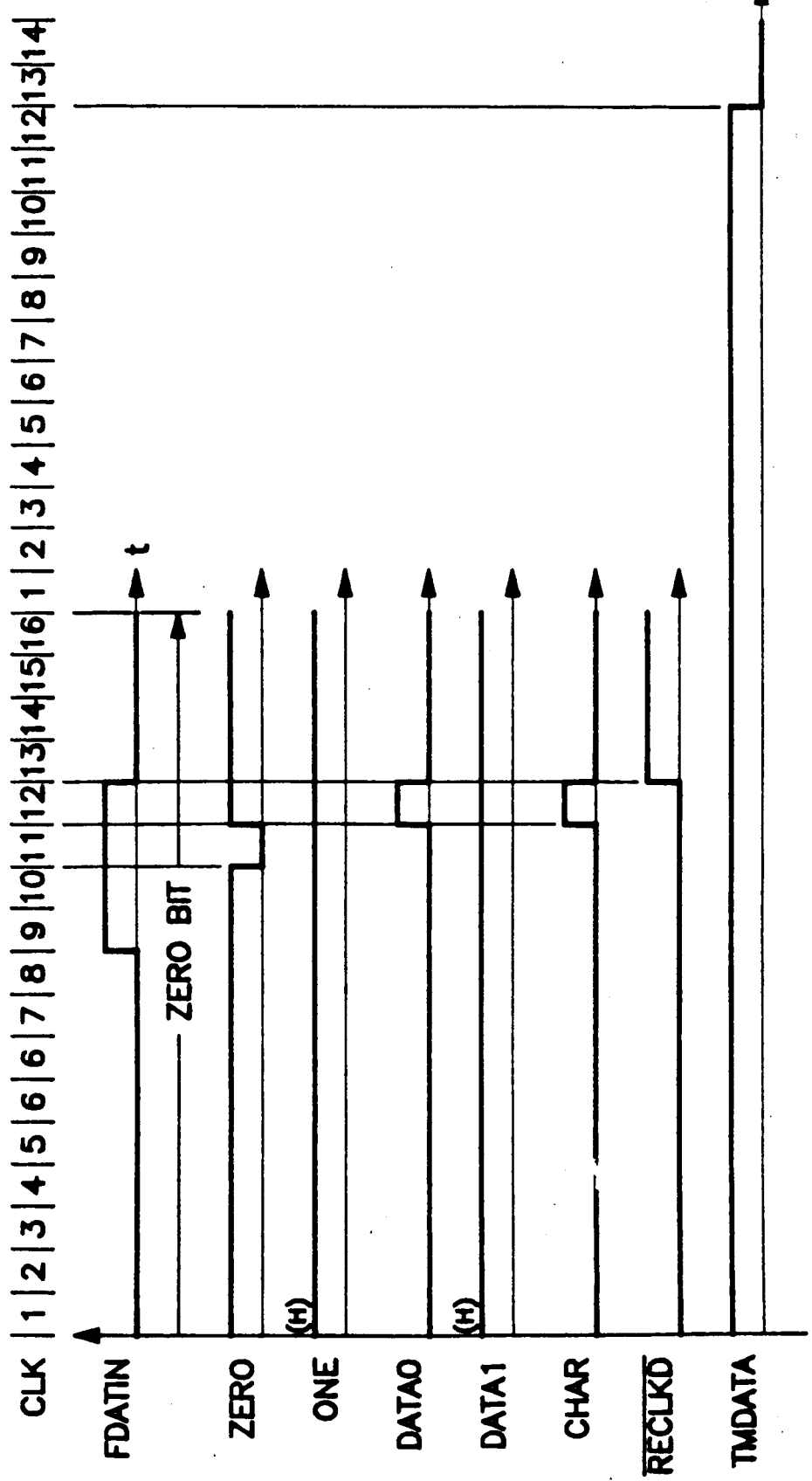
FIG. 10 shows a timing diagram of the operation of the decoder of FIG. 9.

Referring to FIG. 9, there is shown a logic diagram of the decoder 62 of the preferred embodiment of the present invention. A receiver 671 accepts the input signal FDRX from the O/E 52' and couples the inputted serial digital data stream, or serial digital data signal, through a flip flop 672 to a shift register 673 (the input signal being denoted FDATIN). The receiver 671 is of the type DS8922R well known to those skilled in the art. The outputs of the shift register 673 (8 clock intervals 3-10, as shown in Table 1) are coupled to a first NAND-gate 674 and to a second NAND-gate 675, with some of the outputs being inverted, the 8 clock intervals being the third predetermined number of clock times of the preferred embodiment. When a "0" bit is detected, the first NAND-gate 674 outputs a ZERO signal and when an "1" bit is detected, the second NAND-gate 675 outputs a ONE signal. The outputs of the first and second NAND-gates are as indicated in Table 1 below. The outputs from the NAND-gates 674, 675 are then coupled through a series of flip flops, and in particular the signals are latched in JK flip flops 676, and 677, the output of JK flip flop 677 being coupled to the receiver/transmitter 61 to be coupled onto the metallic link 22. FIG. 10 shows a timing diagram of the operation of the decoder of FIG. 9.

fourth clocking circuit, respectively, for determining a respective clock time, said first apparatus comprising:

a) encoder means, for outputting the serial digital data stream onto said transmission medium, wherein the serial digital data stream outputted onto said transmission medium corresponds to serial data received from said first bus during a period of data transmission by said first unit, and wherein the serial digital data outputted onto said transmission medium corresponds to a predetermined serial data pattern during a quiescent period of said first bus, a phase relationship between the serial data on the first bus and the data outputted on the transmission medium being established in a single bit time, a bit time having a first predetermined number of clock times;

b) decoder means, for decoding the serial digital data stream inputted from the transmission medium each clock time to determine the bit value of the information of the serial digital data stream; and c) receiver/transmitter means for coupling information between the first apparatus and the first bus, the information being coupled from the first bus to the first apparatus being the serial data received from the first bus during the period of data transmission for transmission onto the transmission medium in the serial digital data stream form by said encoder means having the phase relationship established in a single bit time, and the information being coupled to the first bus being binary data value decoded by said decoder means in the serial data format of the first bus.

2. An apparatus according to claim 1, wherein said encoder means comprises:

a) first shift register means, for shifting the serial data

TABLE 1

| INPUT DATA STREAM | CLOCK INTERVAL | | | | | | | | | | | | | | | | OUTPUT |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | |
| ZERO DATA | X | X | 1 | 1 | 1 | 1 | 1 | 1 | 0 | 0 | X | X | X | X | X | X | ZERO = TRUE |
| ONE DATA | X | X | 0 | 0 | 0 | 0 | 0 | 0 | 1 | 1 | X | X | X | X | X | X | ONE = TRUE |

WHERE X = DON'T CARE

In a similar manner, the decoding of a "1" bit can be shown.

While there has been shown what is considered a preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

I claim:

1. In a digital data transmission system, for transmitting a serial digital data stream between a first unit a second unit, the serial digital data stream having a series of binary bit values, the bit values comprising information being transferred, and each bit value having a predetermined number of clock times, the first unit connected to a first bus and the second unit connected to a second bus, a first apparatus interfacing the first bus to a transmission medium and a second apparatus interfacing the second bus to the transmission medium, wherein said first unit, said second unit, said first apparatus, and said second apparatus includes a first, second, third, and received from said first bus each clock time, to generate control signals;

b) counter means, operatively connected to said first shift register means, for counting clock times to generate binary output signals of the clock times counted, said counter means being reset and restarted in response to the control signals thereby initiating generation of binary output signals to correspond to the serial data received from said first bus to establish the phase relationship between the serial data and the serial digital data stream in a single bit time; and c) logic means, operatively connected to said first shift register means and to said counter means, for combining the binary output signals to generate the serial digital data stream, wherein the corresponding bit value of the serial data inputted from the first bus is included in a second predetermined number of clock times, the second predetermined number of clocks being less than the first predetermined number of clock times of the bit time.

3. An apparatus according to claim 2, wherein said decoder means comprises:

a) second shift register means, for shifting the serial digital data stream received from the transmission medium;
b) decoding logic means, operatively connected to said second shift register means, for decoding the binary values of the serial digital data stream for a third predetermined number of clock times, the third predetermined number of clock times being less than the first predetermined number of clock times and greater than the second predetermined number of clock times, to determine the binary bit value of the serial digital data stream; and
c) latching means, operatively connected to said decoding logic means, for outputting the binary value of the serial digital data stream determined by the decoding logic means onto the first bus for an entire bit time.

4. An apparatus according to claim 3, wherein the first predetermined number of clock times is 16.

5. An apparatus according to claim 4, wherein the second predetermined number of clock times is 4.

6. An apparatus according to claim 5, wherein the third predetermined number of clock times is 8.

7. An apparatus according to claim 6, wherein said transmission medium is a fiber optic link.

8. An apparatus according to claim 1, wherein said decoder means comprises:
a) shift register means, for shifting the serial digital data stream received from the transmission medium;
b) decoding logic means, operatively connected to said shift register means, for decoding the binary values of the serial digital data stream for a third predetermined number of clock times, the third predetermined number of clock times being less than the first predetermined number of clock times and greater than a second predetermined number of clock times, to determine the binary bit value of the serial digital data stream; and
c) latching means, operatively connected to said decoding logic means, for outputting the binary value of the serial digital data stream determined by the decoding logic means onto the first bus for an entire bit time.

* * * * *